United States Patent [19]

Terane

[11] Patent Number: 5,729,706
[45] Date of Patent: Mar. 17, 1998

[54] MICROCOMPUTER WITH IMPROVED DATA PROCESSING AND DATA TRANSFER CAPABILITIES

[75] Inventor: Hideyuki Terane, Itami, Japan

[73] Assignee: Mitsubishi Denki Kabushiki Kaisha, Tokyo, Japan

[21] Appl. No.: 158,286

[22] Filed: Nov. 29, 1993

[30] Foreign Application Priority Data

Nov. 30, 1992 [JP] Japan .................. 4-345404

[51] Int. Cl.$^6$ .................. G06F 17/14; G06F 19/00
[52] U.S. Cl. .................. 395/310; 395/306; 395/309; 395/376; 395/827; 395/840
[58] Field of Search .................. 395/325, 375, 395/550, 306, 309, 310, 825, 827, 840, 841, 800, 376

[56] References Cited

U.S. PATENT DOCUMENTS

| | | | |
|---|---|---|---|
| 4,528,625 | 7/1985 | McDonough et al. | 364/200 |
| 4,821,174 | 4/1989 | Webb et al. | 364/200 |
| 4,866,604 | 9/1989 | Reid | 395/325 |
| 5,007,012 | 4/1991 | Dujari | 395/842 |
| 5,179,734 | 1/1993 | Candy et al. | 395/800 |
| 5,204,962 | 4/1993 | Uramoto et al. | 395/725 |
| 5,237,667 | 8/1993 | Murakami et al. | 395/375 |

FOREIGN PATENT DOCUMENTS

| | | |
|---|---|---|
| 61-150034 | 7/1986 | Japan . |
| 2100135 | 4/1990 | Japan . |

Primary Examiner—Jack B. Harvey
Assistant Examiner—Jeffrey K. Seto
Attorney, Agent, or Firm—Leydig, Voit & Mayer, Ltd.

[57] ABSTRACT

A microcomputer includes a data processor in a bus transfer circuit of the microcomputer and, therefore, simple data processing is enabled when data are transferred to a bus. Further, a microcomputer includes a bit shifter that shifts the data to an upper bit direction or to a lower bit direction while transferring the data to a bus from a memory and, therefore, bit shifting processing, which is a light load, is enabled while transferring data from the memory to a bus. Further, a microcomputer includes a bit processor that performs an operation on an arbitrary bit of data while transferring the data to a bus from the memory and, therefore, bit processing, which is a light load, is enabled while transferring data to a bus from the memory. Furthermore, a microcomputer includes a bit reverser that inverts the positions of bits in a bit sequence and, therefore, bit reversing processing, which is a light load, is enabled.

23 Claims, 8 Drawing Sheets

MICROCOMPUTER WITH IMPROVED DATA PROCESSING AND DATA TRANSFER CAPABILITIES

FIELD OF THE INVENTION

The present invention relates to a microcomputer and, more particularly, to microcomputer that performs data processing easily, utilizing a transfer time for transferring data to a bus.

PRIOR ART

Generally, a microcomputer has a CPU for processing data, a RAM for storing data, and a ROM for storing a program describing processing to be executed by the CPU, or the like on the same semiconductor chip, and it can operate as a computer in a single semiconductor chip. This is often incorporated into a variety of apparatus to control the apparatus.

A digital signal processor (hereinafter also referred as DSP) is a kind of microcomputer which is appropriate for digital signal processing of video or audio signals, and it includes, in hardware, a multiplier which can execute multiplication which is key for realization of high speed processing of a FFT (fast Fourier transformation) which is often used in digital signal processing.

FIG. 6 schematically shows an example of an internal block construction of a conventional DSP. In the figure, a data operator 1 is provided for conducting a prescribed operation on the data input from a X bus 21a and an Y bus 21b. This data operator 1 is constituted by an arithmetic logic unit (hereinafter referred to as ALU) 1a performing an addition/subtraction and logical operation on data input from the X bus 21a and Y bus 21b, an multiplier 1b performing multiplication of the data input from the X bus 21a and the Y bus 21b, and a shifter 1c performing bit-shift of the data input from the X bus 21a and the Y bus 21b. An accumulator 16 is provided for accumulating the output from the data operator 1. A memory circuit (hereinafter denoted as memory WR) 2 comprising a memory or a word register is provided for storing the output of the accumulator 16, data, a program, or the like from the outside. A control section 15 is provided to decode an instruction included in the program so as to designate an operation which the data operator 1 should execute, or to control the operation timings of the data operator 1, the accumulator 16, and the memory WR 2.

A description is given of the operation.

The instruction input from the outside and stored in the memory WR 2 is fetched by the control section 15, and it is decoded inside the control section 15, whereby the kind of operation to be executed is analyzed. In response to this analysis result, the data operator 1 designates the operation which the data operator 1 should execute, and this is sent out to the data operator 1. In the data operator 1, in response to the information designating the operation to execute, one of the ALU 1a performing addition/subtraction and logical operations, multiplier 1b performing the multiplication which requires a lot of time when employing repetition of addition at high speed, and the shifter 1c performing a bit-shift of such as left shift or right shift corresponding to multiplication or division of the power of 2 at high speed, operates and processes the input data transferred from the memory WR 2 through the X bus 21a and the Y bus 21b. Then, the operation result is output to the accumulator 16, and the accumulator 16 performs addition or subtraction between the last operation result, which is already stored inside thereof, and the current operation result, and further detects the carry or borrow for the addition or subtraction, and stores the result in the memory WR 2. The control section 15 successively fetches the instruction described in the form of program, which is stored in the memory WR 2, and repeats the controls as described above, thereby performing a required processing.

FIG. 7 is a circuit diagram showing a conventional bus transfer circuit of a DSP, and it shows a portion transferring data from the memory WR to the X bus and Y bus shown by broken lines in FIG. 6. The construction is the same for any bit of the bus and, therefore, only the construction for one bit, i.e., the M-th bit, is shown in FIG. 7.

In FIG. 7, a bus 21 is provided for transmitting data or an address between a memory circuit and a data operator inside of the DSP, and in this conventional example, this is a precharging bus of negative logic. The memory WR 2 comprising a memory or a work register is provided inside the DSP for temporarily storing data taken in from the outside or data operated on inside the DSP. A p channel transistor 4 is connected between the positive power supply 8 and the bus 21 for precharging the bus 21 with its gate connected with a precharging signal/PRC. Two n channel transistors are serially connected between the bus 21 and the ground 9, and to the gate of the second transistor 6 at the ground 9 side, the M-th bit of the output signal from the memory WR 2 is applied and to the gate of the first transistor 5 at the bus 21 side, the output of the two-input AND gate 7 is applied. To this AND gate 7, a control signal CTL and a clock signal CLK are connected. The mark <M> added to the output signal from the memory WR 2 indicates that the output signal is the M-th bit signal of the output signal from the memory WR 2.

A description is given of the operation.

The operations are the same for all respective bits and only the operation of the M-th bit is described.

FIG. 8 shows a timing chart of the circuit of FIG. 7 and the inside of the DSP is assumed to be controlled by the four phase clock T0–T3. First of all, in order to precharge the bus 21, the precharging signal/PRC is made "L" in the period T0–T1. Thereby, the p channel transistor 4 is turned ON, whereby the charging path from the positive power supply 8 to the bus 21 is turned ON.

In the period T0–T1, the clock CLK is also at "L", and the output of AND gate 7 turned to "L", whereby the n channel transistor 5 is turned OFF. Therefore, the discharging path from the bus 21 to the ground 9 is turned OFF, and charges flow into the bus 21 through the p channel transistor 4 from the positive power supply 8 and charge the bus 21 to a voltage "H", without being discharged to the ground 9.

In synchronization with the rising of the clock CLK of the clock T1, the memory WR 2 stores data. The control signal CTL is a block selection signal selecting which block is made active among a plurality of blocks constituting the memory WR 2, and when that block is selected in synchronization with the rising of the clock CLK of the clock T1, it rises up to "H".

Then, the clock CLK becomes "H" during the period T2–T3, and when the control signal CTL is "H", the output of the AND Gate 7 becomes "H" during period T2–T3. Accordingly, during this period, the n channel transistor 5 becomes ON. Then, the output of the memory WR 2 is "H", the n channel transistor 6 becomes ON, and the discharging path from the bus 21 to the ground 9 is turned on. On the other hand, the precharging signal/PRC is "H" during period T2–T3, and the charging path from the positive power supply 8 to the bus is turned off, whereby the voltage of the bus 21 is discharged to "L".

On the contrary, when the output of the memory WR 2 is "L" during the period T2–T3, the N channel transistor 6 is turned OFF, and the charging path from the bus 21 to the ground 9 is turned off, whereby the voltage of the bus 21 is held charged to "H". Accordingly, the content of the memory WR 2 is transferred to the bus in an inverted form. Here, "H" designates a state of high voltage and "L" designates a state of low voltage.

The conventional bus transfer circuit of a DSP is constructed as described above, the period of clock T2 has to be used only for the bus transfer, and the efficiency of data processing is reduced.

SUMMARY OF THE INVENTION

It is an object of the present invention to provide a micro computer that can perform simple data processing while transferring data to a bus.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from the detailed description.

According to a first aspect of the present invention, data processing means that can perform simple data processing while transferring data from a memory or work register to a bus is provided.

Therefore, simple data processing can be carried out when transferring data from memory or work register to a bus, and the data processing can be combined with other operations.

According to a second aspect of the present invention, shifting means that can perform shifting of data arbitrarily toward upper or lower bit direction when transferring data from memory means to a bus is provided.

Therefore, bit shifting processing, which is light load processing, can be performed when transferring data from a memory or work register to a bus, and bit shifting processing can be combined with other operations.

According to a third aspect of the present invention, as a data processing means, bit operating means, which can perform an operation on the value of an arbitrary bit of data when transferring data from memory means to a bus, is provided.

Therefore, a bit operation, which is light load processing, can be performed when transferring data from a memory or work register to a bus, and the bit operated can be combined with other operations.

According to a fourth aspect of the present invention, as data processing means, bit reversing means for inverting the positions of bits in a bit sequence constituting data when transferring the data from memory means to the bus is provided.

Therefore, bit reversing processing which is light load processing, can be performed when transferring data from a memory or work register to a bus, and bit reversing processing can be combined with other operations.

DETAILED DESCRIPTION OF THE PREFERRED EMBODIMENT

Figure 1:
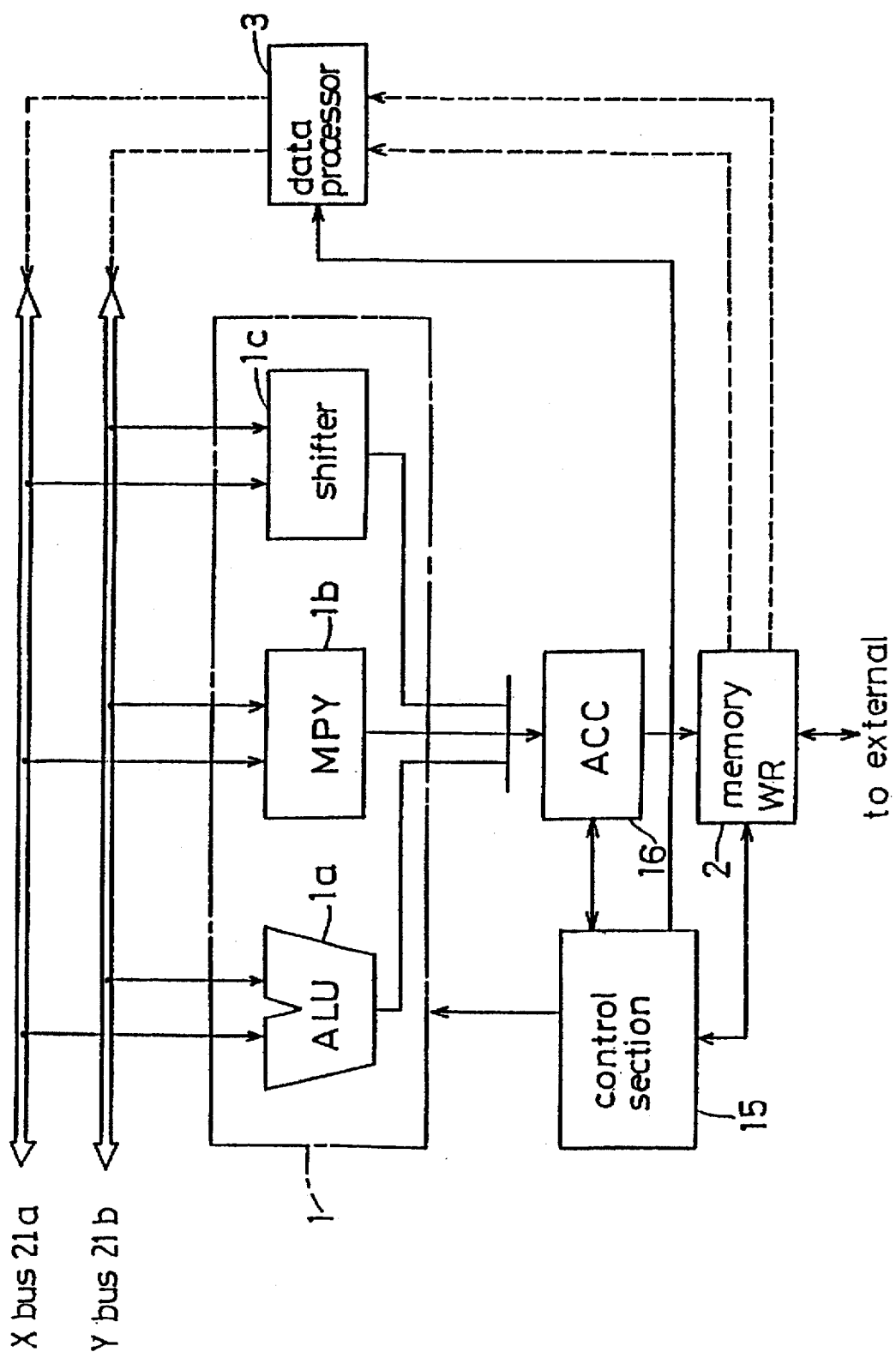
FIG. 1 is a diagram schematically showing an example of a block construction of a micro computer according to a first embodiment of the present invention.

FIG. 1 schematically shows an example of a block construction of the inside of a micro computer according to a first embodiment of the present invention. This example shows a DSP as a kind of a micro computer.

In FIG. 1, a data operator 1 is provided for performing a prescribed operation to the data input from an X bus 21a and a Y bus 21b. This data operator 1 includes an arithmetic logic unit (hereinafter referred to as ALU) 1a performing an addition/subtraction and logical operations to data input from the X bus 21a and Y bus 21b, a multiplier 1b performing multiplication to the data input from the X bus 21a and the Y bus 21b, and a shifter 1c performing a bit-shift to operation on the data input from the X bus 21a and the Y bus 21b. An accumulator 16 is provided for accumulating the output from the data operator 1. A memory circuit (hereinafter denoted as memory WR) 2 comprising a memory or work register is provided for storing the output of the accumulator 16, data, a program, or the like from the outside. A data processor 3 is provided for performing simple data processing when transferring the data from the memory WR 2 to the data operator 1 through the X bus 21a and the Y bus 21b. The data processor 3 1 is controlled by instruction decoding by the control section 15, which is similar to the data operator 1, the memory WR 2, and the accumulator 16, and it is possible to operate this in accordance with a request. In other words, that operation is executed by decoding an oriented instruction regulating the processing which is to be performed by the data processor 3 and the data operator 1. A control section 15 is provided to decode instructions to assign an operation which the data operator 1 is required to execute, or to control the operation timing of the data operator 1 and the accumulator 16, the data processor 3, and the memory WR 2.

Figure 2:
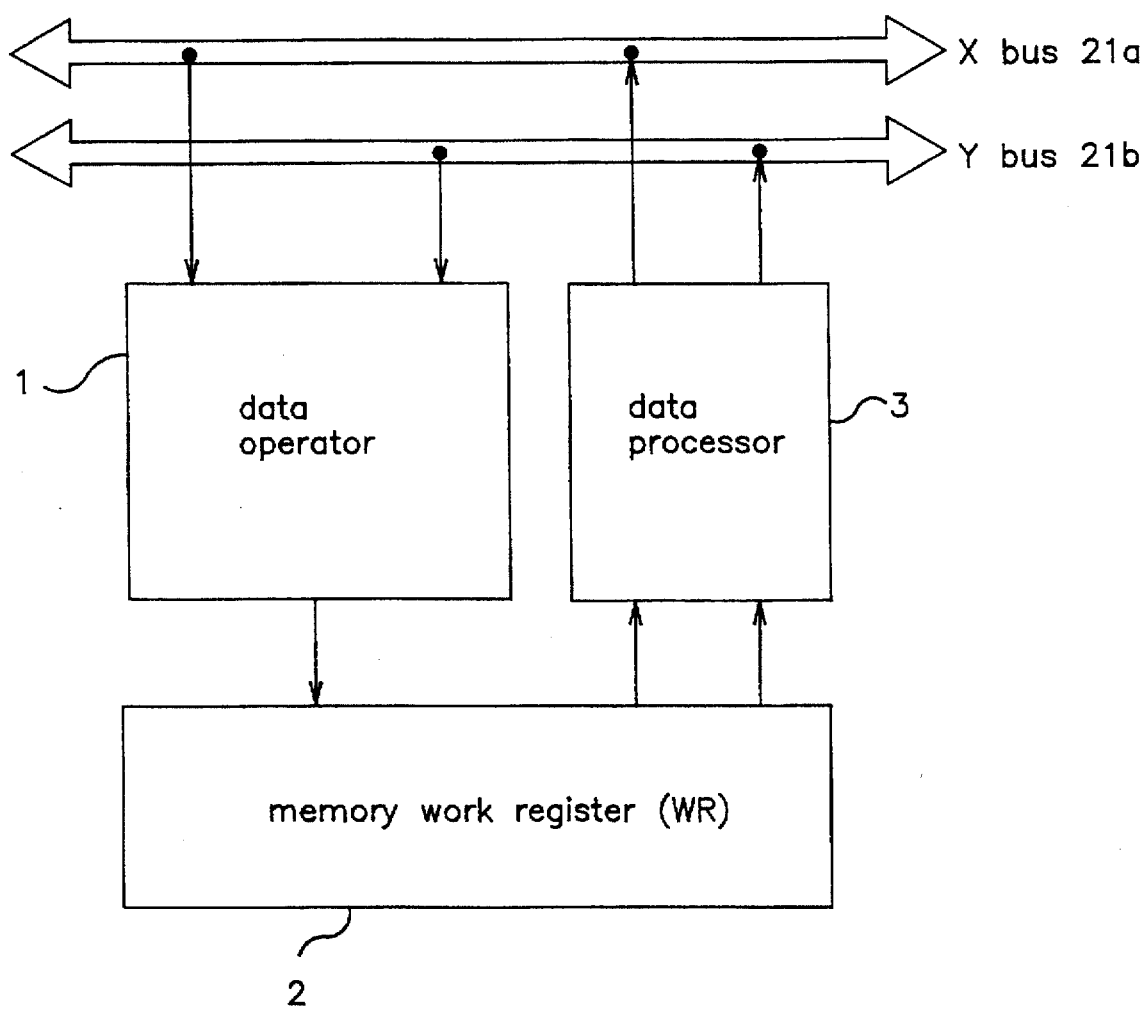
FIG. 2 is a diagram schematically showing a more detailed construction of the micro computer according to the first embodiment of the present invention.

FIG. 2 is a diagram more briefly showing a block construction of the DSP of FIG. 1. In FIG. 2, a data operator 1 is provided for performing an operation to the data input from an X bus 21a and an Y bus 21b. A memory WR 2 is provided for storing the output of this data operator 1. A data processor 3 is provided for performing simple data processing when outputting the data from this memory WR 2. The data operator 1, the memory WR 2 and the data processor 3 are similar to those shown in FIG. 1. The accumulator and the like of FIG. 1 are not shown in FIG. 2.

A description is given of the operation with reference to FIGS. 1 and 2. The brief operation of this first embodiment will be described with reference to FIG. 2 as follows. After the data on the X bus 21a and the Y bus 21b are operated on by the data operator 1, these data are stored in the memory WR 2. The data designated as the source, among the respective data in the memory WR 2, are respectively transferred to the X bus 21a and the Y bus 21b. During this bus transfer, these data pass through the data processor 3, and simple data processing is executed as needed.

The operation of this first embodiment will be described in detail with reference to FIG. 1.

The instructions input to the memory WR 2 from the outside and stored therein are taken into the control section 15 and are decoded inside the control section 15, and the kind of the operations to be executed are analyzed. In accordance with this analysis result, the control section 15 assigns an operation which the data operator 1 should execute, and this is sent out to the data operator 1. In this data operator 1, in accordance with this assigned information, one of the ALU 1a which performs addition/subtraction and logical operations, the multiplier 1b which performs multiplication which, other than when employing repetition of addition requires a lot of time, operates at high speed, and the shifter 1c which performs a bit-shift such as left shift or right shift corresponding to multiplication or division by the power of 2 at high speed, performs an operation to process the input data transferred from the memory WR 2 through the X bus 21a and the Y bus 21b. Then, the operation result is output to the accumulator 16, and the accumulator 16 performs addition or subtraction between the previous operation result which is already stored inside thereof and the current operation result, and further detects the carry or borrow for addition or subtraction, and stores the result in the memory WR 2. The control section 15 successively fetches the instructions described in the form of a program, which is stored in the memory WR 2, and repeats controls as described above, thereby performing a required processing.

Figure 7:
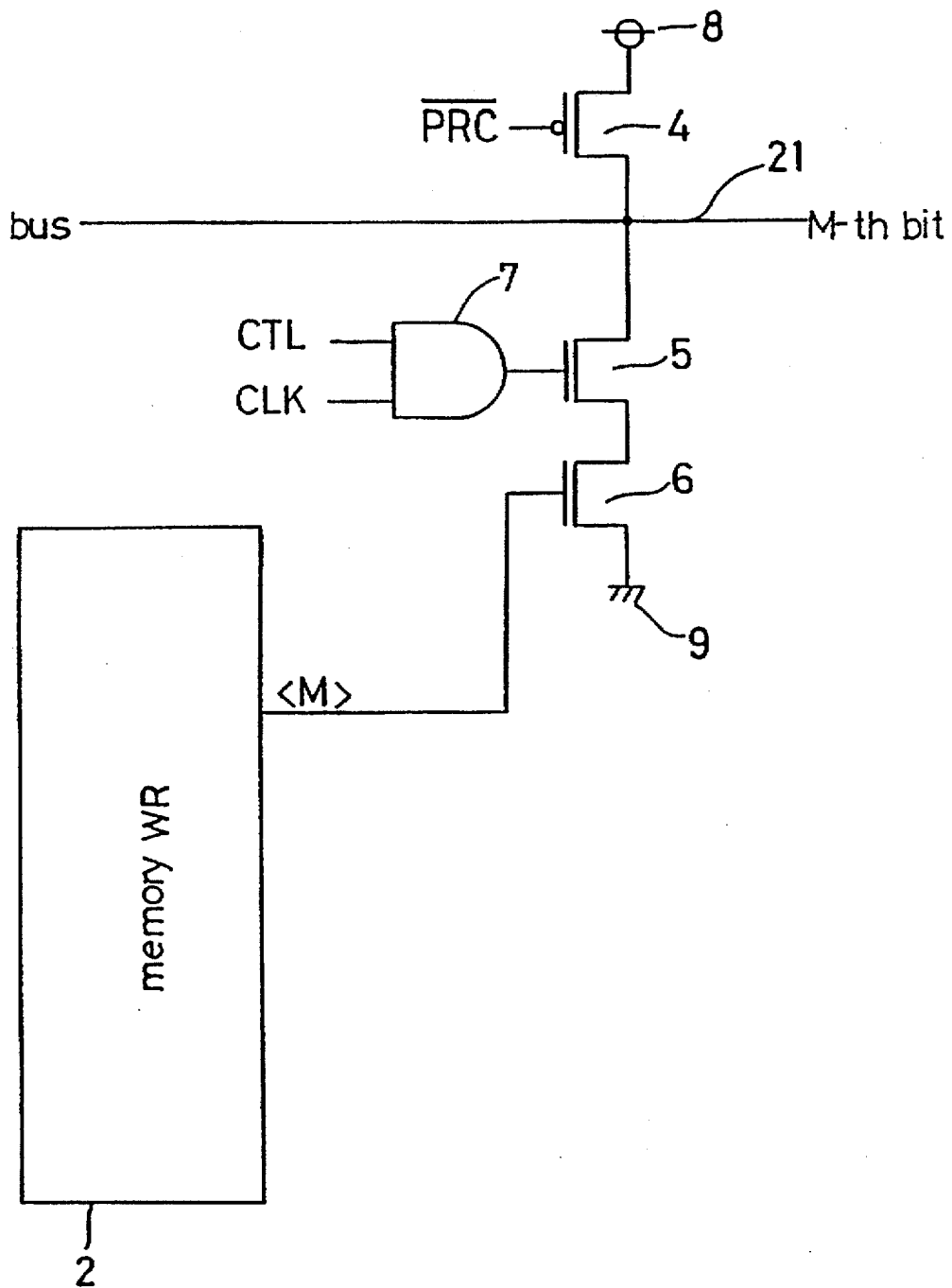
FIG. 7 is a diagram schematically showing a bus transfer circuit of the conventional micro computer.
Figure 8:
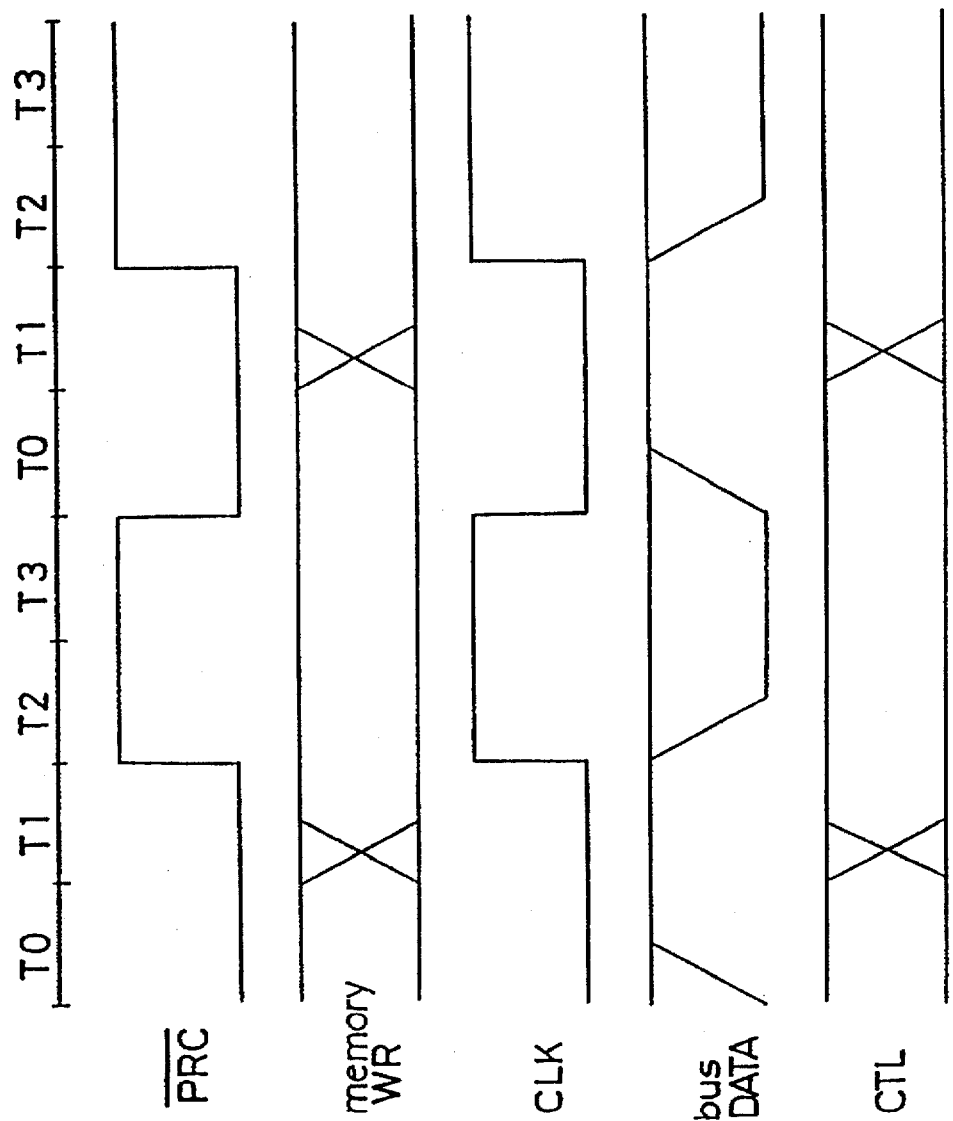
FIG. 8 is a timing chart showing operation timings of the bus transfer circuit of the conventional micro computer.

Although the above-described operation is the same as that of the conventional device shown in FIG. 7, this embodiment enables simple data processing by the data processor 3 when transferring data from the memory WR 2 through the X bus 21a and the Y bus 21b to the data operator 1, during the bus transfer period. Thereby, it is possible to perform simple data processing of, for example, about one gate stage, in combination with other operations to be executed by the data operator 1, and it is further possible to carry out a part of the data processing without consuming the period T2 only for the bus transfer. Furthermore, the entire number of instructions is reduced, and the throughput when the same processes are repeated multiple times can be improved.

Embodiment 2

Figure 3:
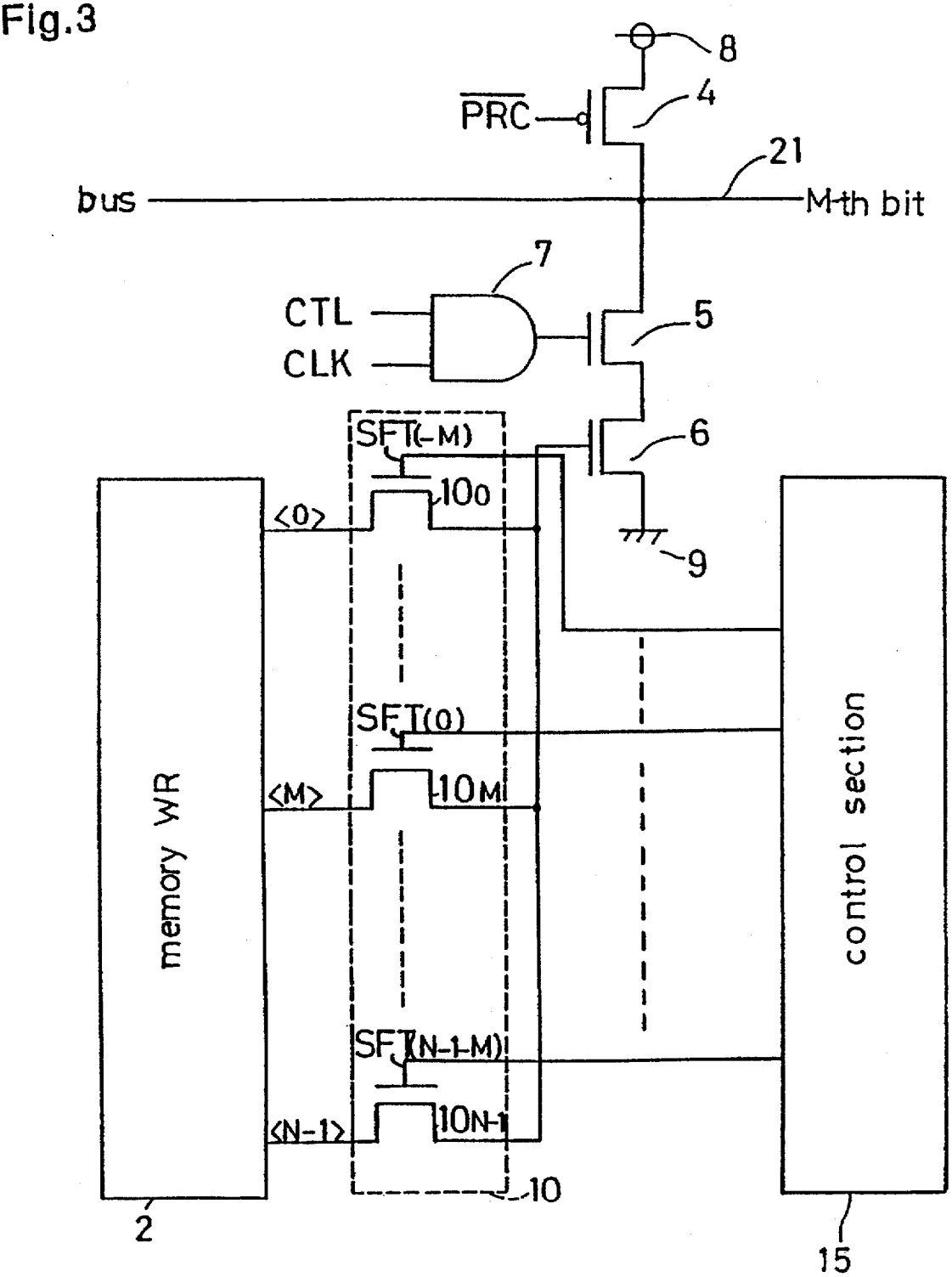
FIG. 3 is a diagram showing a bus transfer circuit of a micro computer according to a second embodiment of the present invention.

A second embodiment of the present invention will be described only for the bus transfer circuit portion in combination with an example of a specific data processor circuit. FIG. 3 is a diagram showing a bus transfer circuit of a micro computer according to a second embodiment of the present invention.

In FIG. 3, a shifter circuit 10 is provided as an example of the data processing circuit of FIG. 2. This shifter circuit 10 includes N n channel transistors $10_0$-$10_M$-$10_{N-1}$ respectively connected between the 0-th bit-(N-1)-th bit of the output of the memory circuit 2 and the gates of the respective n channel transistors 6. The respective gates of the n channel transistors receive control signals SFT(-M)-SFT(0) -SFT(N-1-M). Here, the operations are the same for respective bits, and a description is given of only the M-th bit. The timings of the control signals corresponding to those of the prior art.

A description is given of the operation.

The control signals SFT(-M)-SFT(N-1-M) from the control section 15 reach a state where only one of them is "H" dependent on whether the output data from the memory WR 2 are shifted toward the left direction or the right direction and by what number of bits and all of the others are "L". These control signals SFT(-M)-SFT(N-1-M) change in synchronization with the rising of the clock T1. By these control signals SFT(-M)-SFT(N-1-M) being input to the gates of the n transistors $10_0$-$10_{N-1}$, the data are shifted by an assigned number of bits while transferring the output data from the memory WR 2 to the bus.

In a case where the data are to be shifted by M bits to the leftward direction, when, for example, transferring the output data from the memory WR 2 to the bus 21, only the control signal SFT(-M) to be input to the gate of the transistor $10_0$ of the shifter circuit 10 is made "H", and all the other control signals are made "L". By setting the control signals as such, only the 0-th bit output of the memory WR 2 is connected to the M-th bit transistor 6, and the data obtained by inverting the 0-th bit output of the memory WR 2 is transferred to the M-th bit of the bus 21. By performing similar processing also to the other bits, it is possible to output the data while shifting the same toward the output data from the memory WR 2 to the bus. Here, by making only the control signal SFT(0) "H", it is, of course, possible not to perform shifting processing. To perform shifting to the leftward direction is, of course, possible by constructing a shifter circuit in a reverse construction from that described above.

As described above, in this second embodiment, when transferring data toward the bus from the memory WR to the bus, the data can be transferred shifted toward the left or right by an arbitrary number of bits in a one stage gate circuit. Therefore, bit shifting processing can be processed in the bus. transfer period, and it is possible to execute a part of the data processing without denoting the period of clock T2 entirely to the bus transfer. In addition, the number of instructions can be reduced, and the throughput in a case where the same processes are repeated can be improved.

Embodiment 3

Figure 4:
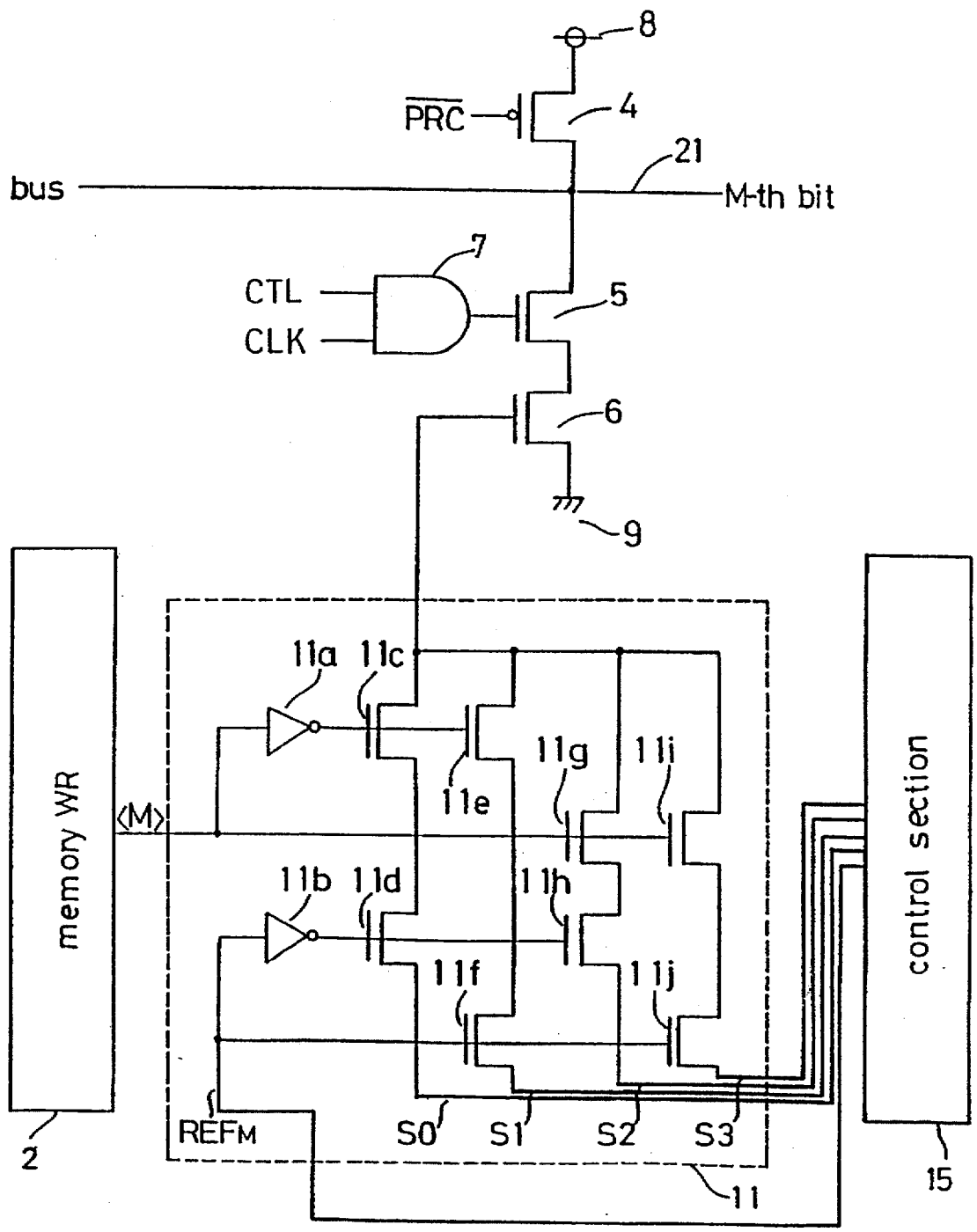
FIG. 4 is a diagram showing a bus transfer circuit of a micro computer according to a third embodiment of the present invention.

Although in the second embodiment, a shifter circuit 10 is provided as a data processor, i.e., a bit operator which performs an arithmetic operation to the value of an arbitrary bit of the data. FIG. 4 shows a third embodiment of the present invention that has such a construction.

In FIG. 4, a bit operator 11 is provided as an example of the data processing circuit 3 of FIG. 2. This bit operator 11 includes n channel transistors 11c and 11d serially connected between the gate of the n channel transistor 6 and the bit operation data S0, n channel transistors 11e and 11f serially connected between the gate of the n channel transistor 6 and the bit operation data S1, n channel transistors 11i and 11j serially connected between the gate of the n channel transistor 6 and the bit operation data S2, and an inverter 11a which inverts the M-th bit output of the memory WR 2 and inputs the same to the gates of the n channel transistors 11c and 11e and an inverter 11b which inverts the M-th bit output $REF_M$ of the reference data and inputs the same to the gates of the n channel transistors 11d and 11h. Here, to the gates of the n channel transistors 11g and 11i, the M-th bit output of the memory WR 2 is input, and to the gates of the n channel transistors 11f and 11j, the M-th bit signal $REF_M$ of the reference data are input. The operations are the same for respective bits, and only that of the M-th bit is described.

The timings of the respective control signals are the same as those of the prior art device.

A description is given of the operation.

The bit operator 11, outputs bit operation data S0 when the output data from the memory WR 2 and the value of data $REF_M$ are (0,0), bit operation data S1 when they are (0,1), bit operation data S2 when they are (1,0), bit operation data S3 when they are (1,1) to the gate electrode of the n channel transistor 6. Here, the $REF_M$ is the value of the M-th bit of the reference data.

That is, although when the output data from the memory WR 2 and the value of the reference data $REF_M$ are (0,0) the gate electrodes of the transistors 11c, 11e and the gate electrodes of the transistors 11d, 11h become "H", because those which are turned on among the transistors mutually serially connected are only the transistor 11c and the transistor 11e, only the bit operation data S0 is output to the gate electrode of the n channel transistor 6. Further, although when the output data from the memory WR 2 and the value of the reference data $REF_M$ are (0,1) the gate electrodes of the transistors 11c, 11e and the gate electrodes of the transistors 11f, 11j become "H", because those which are turned on among the transistors mutually serially connected are only the transistor 11e and the transistor 11f, only the bit operation data S1 is output to the gate electrode of the n channel transistor 6. Further, although when the output data from the memory WR 2 and the value of the reference data $REF_M$ are (1,0), the gate electrodes of the transistors 11g, 11i and the gate electrodes of the transistors 11d, 11h become "H", because those which are turned on among the transistors mutually serially connected are only the transistor 11g and the transistor 11h, only the bit operation data S2 is output to the gate electrode of the n channel transistor 6. Furthermore, although when the output data from the memory WR 2 and the value of the reference data $REF_M$ are (1,1) the gate electrodes of the transistors 11g, 11i and the gate electrodes of the transistors 11f, 11j become "H", because those which are turned on among the transistors mutually serially connected are only the transistor 11i and the transistor 11j, only the bit operation data S3 is output to the gate electrode of the n channel transistor 6.

Accordingly, by establishing the bit operation data such that AND processing (resetting or masking), OR processing (setting), and EXOR (exclusive OR) processing (changing) of the output data from the memory WR and the reference data can be executed, it is possible to output the output data to the bus by bit processing.

That is, when AND processing of the output data from the memory WR 2 and the reference data $REF_M$ is to be performed, the bit operation data S0, S1, S2, S3 are respectively set to "0", "0", "0", "1" so that "1" is output to the gate electrode of the n channel transistor 6 only when the output data of the memory WR 2 and the reference data $REF_M$ are both "1". Further, when OR processing of the output data from the memory WR 2 and the reference data $REF_M$ is to be performed, the bit operation data S0, S1, S2, S3 are respectively set to "0", "1", "1", "1" so that "1" in output to the gate electrode of the n channel transistor 6 only when the output data of the memory WR 2 and the reference data $REF_M$ are both "0". Furthermore, when EXOR processing of the output data from the memory WR 2 and the reference data $REF_M$ is to be performed, the bit operation data S0, S1, S2, S3 are respectively set to "0", "1", "1", "0" so that "1" is output to the gate electrode of the n channel transistor 6 only when the output data of the memory WR 2 and the reference data $REF_M$ are "0", "1" or "1", "0".

Here, the reference data $REF_M$ and the bit operation data S0-S3 change in synchronization with the rising of the clock T1. Accordingly, the output data from the memory WR 2 is subjected to any of AND processing, OR processing, and EXOR processing with the reference data when it is transferred to the bus 21.

In addition, by establishing the bit operation data S0, S1, S2, S3 at "0", "0", "1", "1", respectively, it is, of course, possible pass through through data, i.e., perform no processing, of data. Further, it is, of course, possible to perform processing other than the above-described AND processing, OR processing, EXOR processing, and passing through by establishing the bit operation data S0, S1, S2, S3 at values other than those specified above.

As described above, in this third embodiment, when transferring data from the memory WR to the bus, the data is transferred is subjected to bit operation processing by a circuit including, at most, a two-stage gate, and therefore, bit operation processing, which is a light load that can be completed during the bus transfer period, can be executed, and a part of data processing can be executed without consuming the period T2 only in a bus transfer. In addition, one whole instruction can be eliminated and the throughput, when repeating the same processing, can be improved.

Embodiment 4

Figure 5:
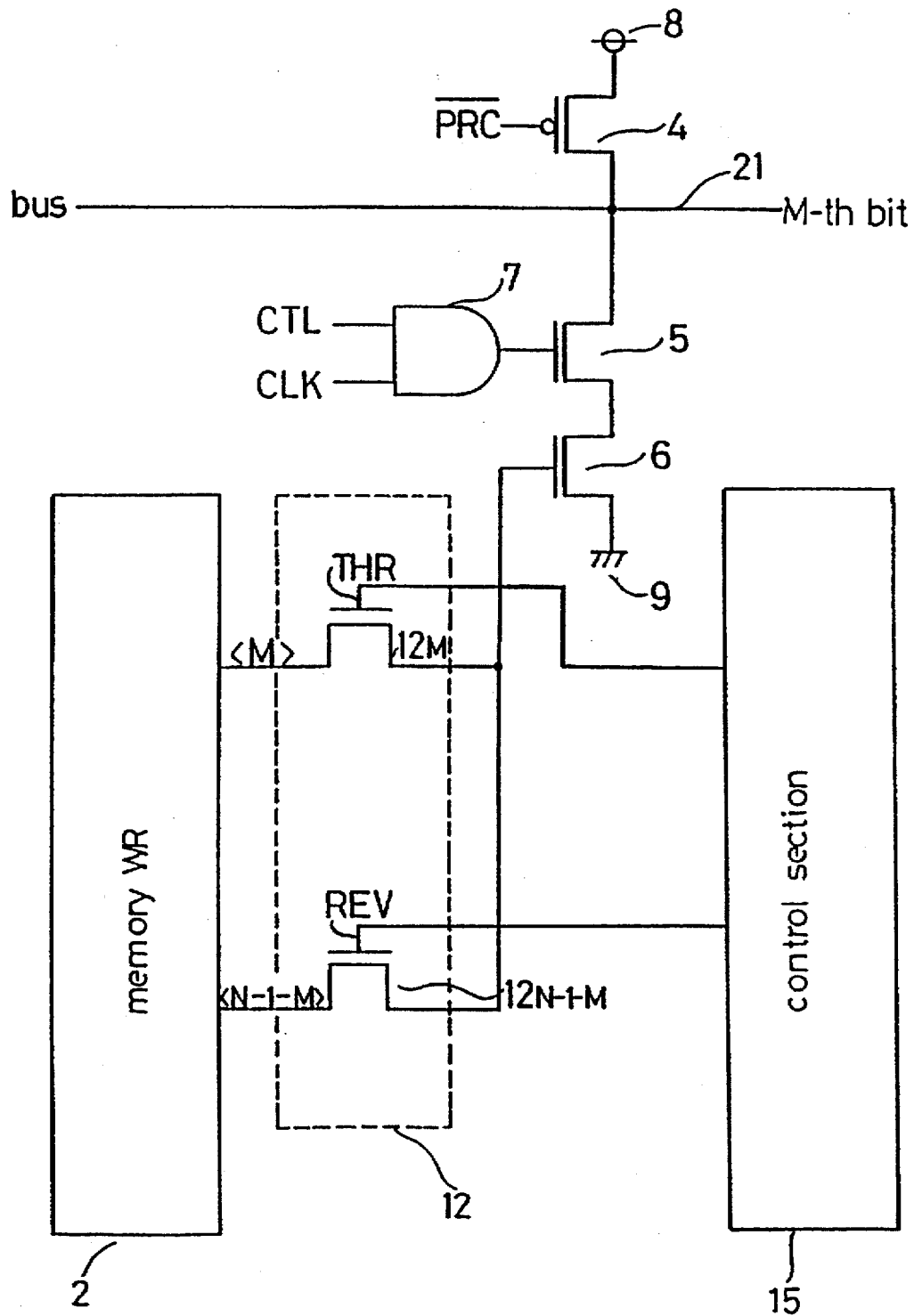
FIG. 5 is a diagram showing a bus transfer circuit of a micro computer according to a fourth embodiment of the present invention.
Figure 6:
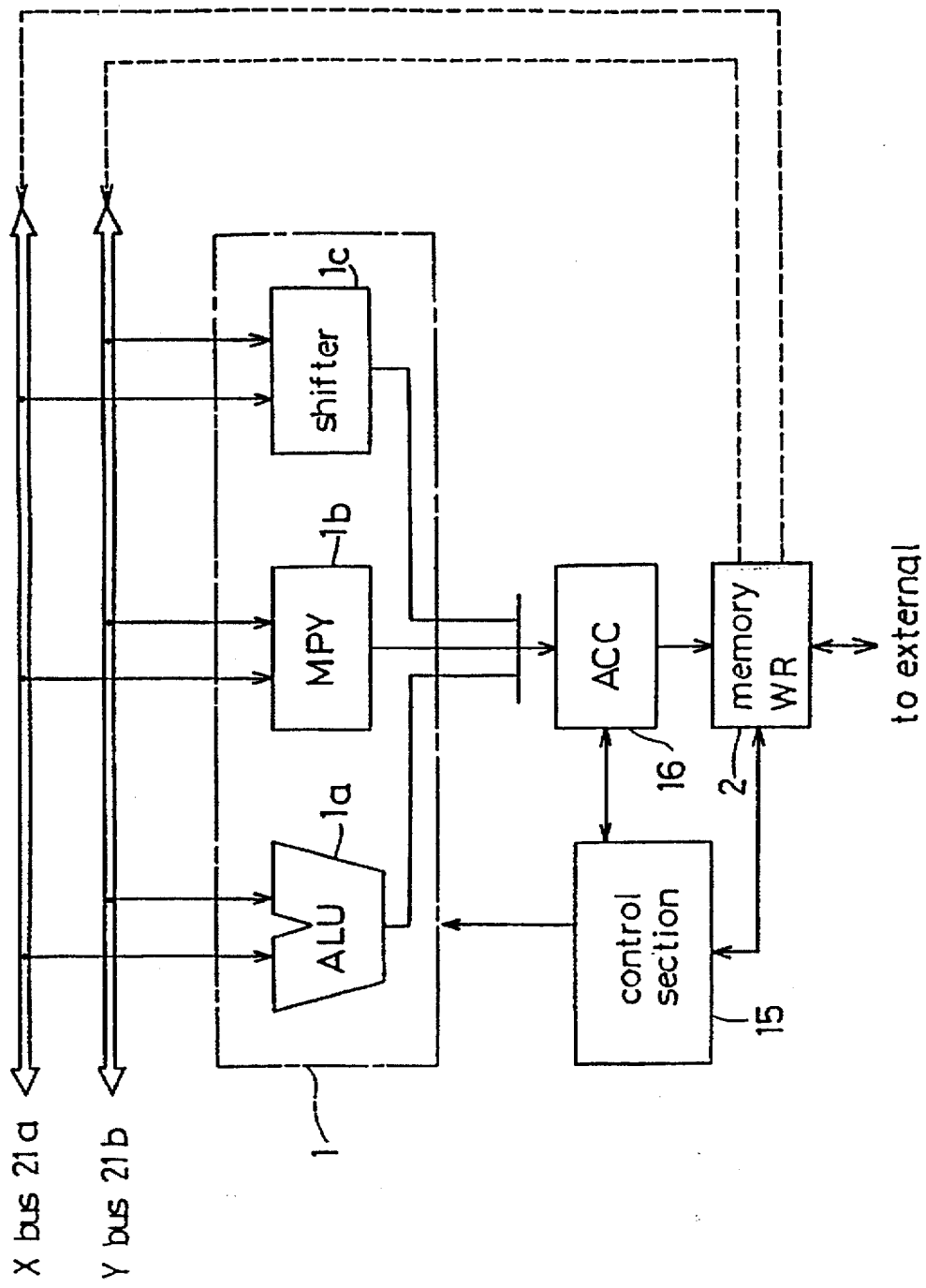
FIG. 6 is a diagram schematically showing a construction of a conventional micro computer.

While in the above-described third embodiment, the bit operator 11 is provided as a data processor, a bit reversing circuit for reversing the positions in bits of the bits sequence of the data can be provided. FIG. 5 shows a fourth embodiment of the present invention according to the present invention. In FIG. 5, a bit reversing circuit 12 is provided as an example of the data processing circuit 3 of FIG. 2. This bit reversing circuit 12 is an n channel transistor $12_{N-1-M}$ connected between the (N-1-M)-th bit output of the memory WR 2 the gate of the n channel transistor 6 and to which the control signal REV is input, and an n channel transistor $12_M$ connected between the M-th bit output of the memory circuit 2 and the gate of the n channel transistor 6 to which the control signal THR is input. Here, the operations are the same for the respective bits and only the operation of the M-th bit is described. The timings of the respective control signals are the same as those in the prior art device.

A description is given of the operation.

The bit reversing circuit 12 interchanges the 0-th bit and the (N-1)-th bit, and the first bit and the (N-2)-th bit, for N bit data. Accordingly, when the bit reversing is performed, the control signal REV and control signal THR are made respectively "H" and "L", and thereby the (N-1-M)-th output the memory WR 2 is output to the M-th bit of the bus 21, and at the same time, through a circuit similar to that shown in FIG. 5, the signal of the M-th bit of the memory WR 2 is output to the (N-1-M)-th bit of the bus 21, whereby the M-th bit output and the (N-1-M)-th output of the memory WR 2 are output to the bus 21 after being interchanged with each other. When the bit reversing is not performed, the control signal REV is made "L", and the control signal THR is made "H" and the M-th output of the memory WR 2 is directly output to the M-th bit of the bus 21.

Here, the control signal REV and the control signal THR change in synchronization with the rising of the clock T1. Accordingly, the output data from the memory WR 2 is subjected to the bit reversing processing while being transferred to the bus 21. Here, by making the control signal THR "H", it is, of course, possible to make it pass through data (i.e., perform no processing).

As described above, in this fourth embodiment, when transferring data from the memory WR to the bus, the data is subjected to bit reversing processing by a one gate stage circuit, whereby a bit reversing processing, a light load is capable of being performed during a bus transfer.

Furthermore, the number of the instructions can be reduced and the throughput, when the same processing is repeated, can be improved.

While in the above-described embodiment a DSP is described as a kind of microcomputer, the invention is not limited to the circuit of FIG. 7 and can be applied to a general microcomputer or microprocessor, and further to a general purpose computer, with the same effects as described above.

While in the above-described embodiment a negative logic precharging bus is described as an example, it can be applied to a bus of other system such as positive logic, with the same effects as described above.

As is evident from the present invention, according to a first embodiment of the present invention, data processing means is provided in a bus transfer circuit of a micro computer, and therefore, simple data processing is enabled while data is being transferred to a bus.

According to a second embodiment of the present invention, shifting means that shifts the data to an upper bit direction or to a lower bit direction while transferring the data to a bus from memory means is provided, and therefore, bit shifting processing, which is a light load, is enabled while transferring data from memory means to a bus.

According to a third embodiment of the present invention, bit processing means that performs an operation to the value of an arbitrary bit of the data while transferring the data to a bus from memory means is provided, and therefore, bit operating processing, which is a light load, is enabled while transferring data to a bus from memory means.

According to a fourth embodiment of the present invention, bit reversing means that inverts the positions of bits in a bit sequence of the data while transferring data from memory means to a bus is provided as data processing means, and therefore, bit reversing processing, which is a light load processing, is enabled.

What is claimed is:

1. A microcomputer comprising:
   a bus for transferring data;
   a data operator connected to said bus for operating on data taken in from said bus;
   memory means connected to said data operator for storing the output of said data operator; and
   data processing means connected to said memory means and said bus for performing data processing on data stored in said memory means while transferring the data from said memory means to said bus.

2. The microcomputer of claim 1, comprising a control section for controlling said data operator, said memory means, and said data processing means in accordance with a program.

3. The microcomputer of claim 2 further comprising an accumulator connected to said data operator and to said memory means and wherein said control section controls said data operator and said data processing means to operate said data operator and said data processing means together.

4. The microcomputer of claim 3 wherein said data operator includes at least one of an arithmetic logical operation unit performing one of addition of, subtraction of, and a logical operation on data, a multiplier multiplying data, and a shifter bit-shifting data.

5. The microcomputer of claim 3 wherein said data processing means includes shifting means for shifting data toward one of an upper bit direction and a lower bit direction while transferring data from said memory means to said bus.

6. The microcomputer of claim 5 including a precharging bus to which said data processing means and the output of said shifting means are connected.

7. The microcomputer of claim 3 wherein said data processing means includes data operating means for performing an operation on an arbitrary bit of said data while transferring data to said bus from said memory means.

8. The microcomputer of claim 7 including a precharging bus to which said data processing means and the output of said data operating means are connected.

9. The microcomputer of claim 3 wherein said data processing means includes a bit reversing means for inverting the position of a bit in a bit sequence of data while transferring data to said bus from said memory means.

10. The microcomputer of claim 2 wherein said control section controls said data operator and said data processing means to operate said data operator and said data processing means together.

11. The microcomputer of claim 2 wherein said data operator includes at least one of an arithmetic logical operation unit performing one of addition of, subtraction of, and a logical operation on data, a multiplier multiplying data, and a shifter bit-shifting data.

12. The microcomputer of claim 2 wherein said data processing means includes shifting means for shifting data toward one of an upper bit direction and a lower bit direction while transferring data from said memory means to said bus.

13. The microcomputer of claim 12 including a precharging bus to which said data processing means and the output of said shifting means are connected.

14. The microcomputer of claim 2 wherein said data processing means includes data operating means for performing an operation on an arbitrary bit of said data while transferring data to said bus from said memory means.

15. The microcomputer of claim 14 including a precharging bus to which said data processing means and the output of said data operating means are connected.

16. The microcomputer of claim 2 wherein said data processing means includes a bit reversing means for inverting the position of a bit in a bit sequence of data while transferring data to said bus from said memory means.

17. The microcomputer of claim 1 wherein said data operator includes at least one of an arithmetic logical operation unit performing one of addition of, subtraction of, and a logical operation on data, a multiplier multiplying data, and a shifter bit-shifting data.

18. The microcomputer of claim 1 wherein said data processing means includes shifting means for shifting data toward one of an upper bit direction and a lower bit direction while transferring data from said memory means to said bus.

19. The microcomputer of claim 18, including a precharging bus to which said data processing means and the output of said shifting means are connected.

20. The microcomputer of claim 1 wherein said data processing means includes data operating means for performing an operation on an arbitrary bit of said data while transferring data to said bus from said memory means.

21. The microcomputer of claim 20, including a precharging bus to which said data processing means and the output of said data operating means are connected.

22. The microcomputer of claim 1 wherein said data processing means includes a bit reversing means for inverting the position of a bit in a bit sequence of data while transferring data to said bus from said memory means.

23. The microcomputer of claim 1 including a precharging bus to which said data processing means is connected.

* * * * *